(12) United States Patent
Wiseman et al.

(10) Patent No.: US 8,855,316 B2
(45) Date of Patent: Oct. 7, 2014

(54) QUANTUM CRYPTOGRAPHY APPARATUS

(75) Inventors: Simon Robert Wiseman, Malvern (GB); Brian Sinclair Lowans, Malvern (GB); Richard Middleton Hicks, Malvern (GB)

(73) Assignee: Qinetiq Limited, London (GB)

( * ) Notice: Subject to any disclaimer, the term of this patent is extended or adjusted under 35 U.S.C. 154(b) by 50 days.

(21) Appl. No.: 12/863,510

(22) PCT Filed: Jan. 23, 2009

(86) PCT No.: PCT/GB2009/000189
§ 371 (c)(1),
(2), (4) Date: Jul. 19, 2010

(87) PCT Pub. No.: WO2009/093036
PCT Pub. Date: Jul. 30, 2009

(65) Prior Publication Data
US 2010/0293380 A1    Nov. 18, 2010

Related U.S. Application Data

(60) Provisional application No. 61/023,564, filed on Jan. 25, 2008, provisional application No. 61/071,801, filed on May 19, 2008.

(30) Foreign Application Priority Data

Jan. 25, 2008   (GB) .................................... 0801406.0
May 19, 2008  (GB) .................................... 0809042.5

(51) Int. Cl.
*H04L 9/08*   (2006.01)

(52) U.S. Cl.
CPC ............ *H04L 9/0855* (2013.01); *H04L 9/0852* (2013.01)
USPC .......................................... 380/278; 380/277

(58) Field of Classification Search
USPC .................................. 380/256; 713/169, 171
See application file for complete search history.

(56) References Cited

U.S. PATENT DOCUMENTS 3,704,996 A   12/1972 Borner et al.
4,291,939 A    9/1981 Giallorenzi et al.
(Continued)

FOREIGN PATENT DOCUMENTS

EP    0 583 115 A1   2/1994
EP    0 610 727 A1   8/1994
(Continued)

OTHER PUBLICATIONS

Bechmann-Pasquinucci H, Pasquinucci A: "Quantum Key Distribution With Trusted Quantum Relay"; University of Pavia; UCI.IT, [Online]; May 13, 2005, pp. 1-13; XP002534289; Pavia, Italy Retrieved from the Internet: URL: http://www.quantumoptics.it/research/publications/0505089.pdf; cited in the application pp. 2-4.*

(Continued)

*Primary Examiner* — Brandon Hoffman
*Assistant Examiner* — Carlos Amorin
(74) *Attorney, Agent, or Firm* — Oliff PLC (57) ABSTRACT

The method involves exchange of a quantum signal between a first quantum node and a second quantum node as is usual in known quantum key distribution (QKD) scheme. The first quantum node communicates details of the quantum signal it sent or received with a first remote node. The first remote node thus has all the information to required to take the place of the first quantum node in the key agreement step with the second quantum node. The first quantum node may be arranged to transmit the quantum signal to the second quantum node, in which case the invention provides a distributed quantum transmitter with the control logic in the first remote node being distributed remotely from the actual quantum transmitter in the first quantum node. Communications between the first remote node and first quantum node may comprise or be protected by a quantum key derived by conventional QKD.

21 Claims, 4 Drawing Sheets

(56) References Cited

U.S. PATENT DOCUMENTS

| | | |
|---|---|---|
| 4,691,984 A | 9/1987 | Thaniyavarn |
| 4,775,971 A | 10/1988 | Bergmann |
| 4,807,952 A | 2/1989 | Jaeger et al. |
| 4,846,540 A | 7/1989 | Kapon |
| 5,150,436 A | 9/1992 | Jaeger et al. |
| 5,157,754 A | 10/1992 | Bierlein et al. |
| 5,166,991 A | 11/1992 | Jaeger et al. |
| 5,410,625 A | 4/1995 | Jenkins et al. |
| 5,414,789 A | 5/1995 | Tamil et al. |
| 5,428,698 A | 6/1995 | Jenkins et al. |
| 5,479,514 A | 12/1995 | Klonowski |
| 5,481,636 A | 1/1996 | Fukuda et al. |
| 5,566,257 A | 10/1996 | Jaeger et al. |
| 5,644,664 A | 7/1997 | Burns et al. |
| 5,757,912 A | 5/1998 | Blow |
| 5,768,378 A | 6/1998 | Townsend et al. |
| 5,878,142 A | 3/1999 | Caputo et al. |
| 5,999,548 A | 12/1999 | Mori et al. |
| 6,028,935 A | 2/2000 | Rarity et al. |
| 6,145,079 A | 11/2000 | Mitty et al. |
| 6,240,514 B1 | 5/2001 | Inoue et al. |
| 6,717,708 B2 | 4/2004 | Prosyk |
| 6,798,795 B2 | 9/2004 | Yoo |
| 6,806,986 B2 | 10/2004 | Asobe et al. |
| 7,068,790 B1 | 6/2006 | Elliott |
| 7,155,078 B2 | 12/2006 | Welch et al. |
| 7,162,107 B2 | 1/2007 | Bull et al. |
| 7,181,114 B2 | 2/2007 | Lee et al. |
| 7,242,775 B2 | 7/2007 | Vig et al. |
| 7,242,821 B2 | 7/2007 | Bull et al. |
| 7,248,695 B1 | 7/2007 | Beal et al. |
| 7,274,791 B2 | 9/2007 | Van Enk |
| 7,289,688 B2 | 10/2007 | Bull et al. |
| 7,430,295 B1 | 9/2008 | Pearson et al. |
| 7,457,416 B1 | 11/2008 | Elliott |
| 7,460,670 B1 | 12/2008 | Elliott |
| 7,515,716 B1 | 4/2009 | Elliott |
| 7,515,801 B2 | 4/2009 | McCaughan et al. |
| 7,596,318 B2 | 9/2009 | Han et al. |
| 7,627,126 B1 | 12/2009 | Pikalo et al. |
| 7,646,873 B2 | 1/2010 | Lee et al. |
| 7,706,535 B1 * | 4/2010 | Pearson et al. ........... 380/255 |
| 7,760,883 B2 | 7/2010 | Kuang |
| 7,864,958 B2 | 1/2011 | Harrison et al. |
| 7,865,048 B2 | 1/2011 | McCaughan et al. |
| 8,054,976 B2 | 11/2011 | Harrison et al. |
| 8,488,790 B2 * | 7/2013 | Wellbrock et al. ........... 380/255 |
| 2002/0025046 A1 | 2/2002 | Lin |
| 2002/0087862 A1 | 7/2002 | Jain et al. |
| 2003/0210912 A1 | 11/2003 | Leuthold et al. |
| 2003/0214991 A1 | 11/2003 | Wiedmann et al. |
| 2004/0032954 A1 | 2/2004 | Bonfrate et al. |
| 2004/0034776 A1 | 2/2004 | Fernando et al. |
| 2004/0109564 A1 | 6/2004 | Cerf et al. |
| 2004/0184603 A1 * | 9/2004 | Pearson et al. ........... 380/28 |
| 2004/0184615 A1 * | 9/2004 | Elliott et al. ........... 380/283 |
| 2004/0252957 A1 | 12/2004 | Schmidt et al. |
| 2005/0078826 A1 | 4/2005 | Takeuchi |
| 2005/0135620 A1 * | 6/2005 | Kastella et al. ........... 380/256 |
| 2005/0190921 A1 | 9/2005 | Schlafer et al. |
| 2005/0249352 A1 | 11/2005 | Choi et al. |
| 2005/0259825 A1 * | 11/2005 | Trifonov ........... 380/277 |
| 2005/0286723 A1 * | 12/2005 | Vig et al. ........... 380/278 |
| 2006/0002563 A1 | 1/2006 | Bussieres et al. |
| 2006/0029041 A1 | 2/2006 | Jabri et al. |
| 2006/0031828 A1 | 2/2006 | Won et al. |
| 2006/0059343 A1 * | 3/2006 | Berzanskis et al. ........... 713/171 |
| 2006/0062392 A1 | 3/2006 | Lee et al. |
| 2006/0067603 A1 | 3/2006 | Bull et al. |
| 2006/0083379 A1 | 4/2006 | Brookner |
| 2007/0014415 A1 * | 1/2007 | Harrison et al. ........... 380/278 |
| 2007/0016534 A1 | 1/2007 | Harrison et al. |
| 2007/0065154 A1 | 3/2007 | Luo et al. |
| 2007/0065155 A1 | 3/2007 | Luo et al. |
| 2007/0071245 A1 | 3/2007 | Kuang |
| 2007/0074277 A1 | 3/2007 | Tofts et al. |
| 2007/0076884 A1 * | 4/2007 | Wellbrock et al. ........... 380/263 |
| 2007/0101410 A1 | 5/2007 | Harrison et al. |
| 2007/0104443 A1 | 5/2007 | Helmy |
| 2007/0122097 A1 | 5/2007 | Schmidt et al. |
| 2007/0123869 A1 | 5/2007 | Chin et al. |
| 2007/0130455 A1 | 6/2007 | Elliott |
| 2007/0133798 A1 | 6/2007 | Elliott |
| 2007/0160201 A1 | 7/2007 | Blom et al. |
| 2007/0177735 A1 | 8/2007 | Mimih et al. |
| 2007/0192598 A1 * | 8/2007 | Troxel et al. ........... 713/168 |
| 2008/0003104 A1 | 1/2008 | Betlach |
| 2008/0013738 A1 * | 1/2008 | Tajima et al. ........... 380/278 |
| 2008/0031456 A1 | 2/2008 | Harrison et al. |
| 2008/0144836 A1 * | 6/2008 | Sanders et al. ........... 380/278 |
| 2008/0147820 A1 | 6/2008 | Maeda et al. |
| 2008/0175385 A1 * | 7/2008 | Lee et al. ........... 380/256 |
| 2008/0292095 A1 * | 11/2008 | Vig et al. ........... 380/2 |
| 2008/0317423 A1 | 12/2008 | Stepanov et al. |
| 2009/0016736 A1 * | 1/2009 | Beal et al. ........... 398/144 |
| 2009/0074192 A1 | 3/2009 | Beal et al. |
| 2009/0106551 A1 | 4/2009 | Boren et al. |
| 2009/0175452 A1 | 7/2009 | Gelfond et al. |
| 2009/0316910 A1 * | 12/2009 | Maeda et al. ........... 380/279 |
| 2010/0098252 A1 | 4/2010 | Kanter et al. |
| 2010/0226659 A1 * | 9/2010 | Nishioka et al. ........... 398/154 |
| 2010/0290626 A1 | 11/2010 | Jenkins et al. |
| 2010/0299526 A1 * | 11/2010 | Wiseman et al. ........... 713/171 |
| 2010/0329459 A1 | 12/2010 | Wiseman et al. |

FOREIGN PATENT DOCUMENTS

| | | |
|---|---|---|
| EP | 1 503 328 A1 | 2/2005 |
| EP | 2 081 317 A2 | 6/2005 |
| EP | 1 605 287 A2 | 12/2005 |
| EP | 1 633 076 A1 | 3/2006 |
| EP | 1 643 663 A1 | 5/2006 |
| EP | 1 715 615 A1 | 10/2006 |
| EP | 1 833 009 A1 | 9/2007 |
| EP | 1 848 142 A2 | 10/2007 |
| EP | 1 865 656 A1 | 12/2007 |
| EP | 2 003 812 A2 | 12/2008 |
| EP | 2 081 317 A2 | 7/2009 |
| GB | 2 379 847 A | 3/2003 |
| GB | 2 397 452 A | 7/2004 |
| GB | 2 427 336 A | 12/2006 |
| GB | 2 453 471 A | 4/2009 |
| JP | A-2005-268958 A | 9/2005 |
| JP | A-2007-5003070 A | 1/2007 |
| JP | A-2007-129562 | 5/2007 |
| WO | WO 92/11550 A1 | 7/1992 |
| WO | WO 92/11551 A1 | 7/1992 |
| WO | WO 92/11554 A1 | 7/1992 |
| WO | WO 92/11555 A1 | 7/1992 |
| WO | WO 95/07582 A1 | 3/1995 |
| WO | WO 97/44936 A1 | 11/1997 |
| WO | WO 02/15626 A1 | 2/2002 |
| WO | WO 03/015370 A2 | 2/2003 |
| WO | WO 03/065091 A2 | 8/2003 |
| WO | WO 2004/083915 A1 | 9/2004 |
| WO | WO 2004/083923 A1 | 9/2004 |
| WO | WO 2004/105289 A3 | 12/2004 |
| WO | WO 2005/012968 A1 | 2/2005 |
| WO | WO 2005/012970 A1 | 2/2005 |
| WO | WO 2006/031828 A2 | 3/2006 |
| WO | WO 2006/134290 A2 | 12/2006 |
| WO | WO 2007/023286 A1 | 3/2007 |
| WO | WO 2007/105834 A1 | 9/2007 |
| WO | WO 2007/121587 A1 | 11/2007 |
| WO | WO 2007/123869 A2 | 11/2007 |
| WO | WO 2008/003104 A1 | 1/2008 |
| WO | WO 2008/032048 A1 | 3/2008 |
| WO | WO 2008/146395 A1 | 12/2008 |
| WO | WO 2009/001226 A3 | 12/2008 |
| WO | WO 2009/093034 A3 | 7/2009 |
| WO | WO 2009/093036 A2 | 7/2009 |
| WO | WO 2009/093037 A1 | 7/2009 |
| WO | WO 2009/095644 A1 | 8/2009 |
| WO | WO 2009/141586 A1 | 11/2009 |

(56) References Cited

FOREIGN PATENT DOCUMENTS

| WO | WO 2009/141587 A1 | 11/2009 |
|---|---|---|
| WO | WO 2010/049673 A1 | 5/2010 |
| WO | WO 2010/064003 A1 | 6/2010 |
| WO | WO 2010/064004 A1 | 6/2010 |

OTHER PUBLICATIONS

Le Q-C, Bellot P: "Enhancement of AGT Telecommunication Security Using Quantum Cryptography"; Ecole nationale superieure des telecommunications; 1-4244-0316-2/06; 2006 IEEE.*
Ljunggren, D. et al., "Authority-based user authentication in quantum key distribution", Physical Review A, vol. 62, pp. 022305-1 through 022305-7, Jul. 13, 2000; 1050-2947/2000/62(2)/ 022305(7).*
Rass, S., "A method of Authentication for Quantum Networks", PWASET, vol. 12; Mar. 2006; ISSN 1307-6884, pp. 149-154.*
Le, Quoc-Cuong et al., "Enhancement of AGT Telecommunication Security using Quantum Cryptography", IEEE, 2006; 1-42440316-2/06, pp. 7-16.*
Bechmann-Pasquinucci et al., "Quantum key distribution with trusted quantum relay", May 12, 2005, pp. 1-13.*
Office Action dated May 11, 2012 issued in U.S. Appl. No. 12/812,849.
Stucki et al., "Quantum Key Distribution Over 67km With Plug &Play System," New Journal of Physics 4, pp. 41.1-41.8, 2002.
Jun. 1, 2011 International Search Report issued in Application No. PCT/GB2010/001811.
Jun. 1, 2011 Written Opinion issued in Application No. PCT/ GB2010/001811.
Toliver P., et al. "Demonstration of 1550 nm QKD with ROADM-based DWDM Networking and the Impact of Fiber FWM," 2007 Conference on Lasers and Electro-Optics, May 5-11, 2007, Baltimore, MD, Optical Society of America, May 6, 2007, pp. 1-2, XP031231023.
Bechmann-Pasquinucci et al., "Quantum key distribution with trusted quantum relay," May 12, 2005, pp. 1-13, <http://arxiv.org/ PS_cache/quant-ph/pdf/0505/0505089v1.pdf>.
Bennett et al., "Quantum Cryptography: Public Key Distribution and Coin Tossing," International Conference on Computers Systems & Signal Processing, Dec. 10-12, 1984, pp. 1-5, Bangalore, India.
Duligall et al., "Low cost and compact quantum key distribution," New Journal of Physics 8, 249, pp. 116, 2006.
Elliott, "Building the quantum network," New Journal of Physics 4, pp. 46.1-46.12, 2002, XP-002271991.
Fernandez et al., "Gigahertz Clocked Quantum Key Distribution in Passive Optical Networks," Leos Summer Topical Meetings, 2006 Digest of the Quebec City, Canada, Jul. 17, 2006, pp. 36-37, XP-010940123.
Fernandez et al., "Passive Optical Network Approach to GigahertzClocked Multiuser Quantum Key Distribution," IEEE Journal of Quantum Electronics, vol. 43, No. 2, pp. 130-138, Feb. 2007.
Brassard et al., "Multi-User Quantum Key Distribution Using Wavelength Division Multiplexing," pp. 1-5, XP-002534322, <http:// citeseerx.ist.psu.edu/viewdoc/download?doi=10.1.1.87.378 &rep=rep1&type=pdf>.
Gordeev et al., "Tunable electro-optic polarization modulator for quantum key distribution applications," Optics Communications, vol. 234, pp. 203-210, 2004.
Horikiri et al., "Quantum key distribution with a heralded single photon source," International Quantum Electronics Conference, 2005, pp. 1617-1618, Jul. 11, 2005.
Lee et al., "Quantum Authentication and Quantum Key Distribution Protocol," Jan. 11, 2006,pp. 1-8, <http://arxiv.org/PS_cache/quant-ph/pdf/0510/0510144v2.pd P.
Rao et al., "Nonlinear frequency conversion in semiconductor optical waveguides using birefringent, modal and quasiphase-matching techniques," Journal of Optics A: Pure and Applied Optics, vol. 6, pp. 569-584, 2004.

Karlsson et al., "Authority-based user authentication in quantum key distribution," Physical Review A, vol. 62, pp. 022305-1-022305-7, 2000, XP-002534291.
Kuhn, "A Quantum Cryptographic Protocal with Detection of Compromised Server," Quantum Information and Computation, vol. 5, No. 7, pp. 551-560, 2005, XP-002520284.
Kumavor et al., "Comparison of Four Multi-User Quantum Key Distribution Schemes Over Passive Optical Networks," Journal of Lightwave Technology, vol. 23, No. 1, pp. 268276, Jan. 2005, XP-001227328.
Malis et al., "Improvement of second-harmonic generation in quantum-cascade lasers with true phase matching," Applied Physics Letters, vol. 84, No. 15, pp. 2721-2723, Apr. 12, 2004.
Mašanović et al., "Design and Performance of a Monolithically Integrated Widely Tunable All Optical Wavelength Converter With Independent Phase Control," IEEE Photonics Technology Letters, vol. 16, No. 10, pp. 2299-2301, Oct. 2004.
Menezes, Handbook of Applied Cryptography, Chapter 13 Key Management Techniques, CRC Press LLC, pp. 547-553, 1997, XP-002520285.
Nambu et al., "BB84 Quantum Key Distribution System based on SilicaBased Planar Lightwave Circuits," Apr. 22, 2008, pp. 1-11, <http://arxiv.org/PS_cache/quant-ph/pdf/0404/0404015.pdf>.
Hwang et al., "Provably Secure ThreaParty Authenticated Quantum Key Distribution Protocols," IEEE Transactions on Dependable and Secure Computing, vol. 4, No. 1, pp. 71-80, Jan.-Mar. 2007.
Mo et al., "Quantum key distribution network with wavelength addressing," Oct. 15, 2006, pp. 1-11, <http://arxiv.org/PS_cache/ quant-ph/pdf/0610/0610096v2.pdf>, XP-002534290.
Nguyen et al., "802.11i Encryption Key Distribution Using Quantum Cryptography," Journal of Networks, vol. 1, No. 5, pp. 9-20, Sep./ Oct. 2006, XP-002576733.
Moutzouris et al., "Second Harmonic Generation in GaAs/AlGaAs Waveguides With Femtosecond Pulses Near 1.55 μm Using Modal Phase Matching Technique," Lasers and Electro-Optics Europe, 2003 Conference Munich, Germany, Jun. 22-27, 2003, XP-010710252.
Jäger et al., "Modal dispersion phase matching over 7 mm length in overdamped polymeric channel waveguides," Applied Physics Letters, vol. 69, No. 27, pp. 4139-4141, Dec. 30, 1996.
Yin et al., "Integrated ARROW waveguides with hollow cores," Optics Express, vol. 12, No. 12, pp. 210-2715, Jun. 14, 2004, XP-002363659.
Yariv, "Coupled-Mode Theory for Guided-Wave Optics," IEEE Journal of Quantum Electronics, vol. QE-9, No. 9, pp. 919-933, Sep. 1973.
Rahmatian, "An Ultrahigh-Speed AlGaAs-GaAs Polarization Converter Using Slow-Wave Coplanar Electrodes," IEEE Photonics Technology Letters, vol. 10, No. 5, pp. 675-677, May 1998.
Finlayson et al., "Polarization Conversion in Passive DeepEtched GaAs/AlGaAs Waveguides," Journal of Lightwave Technology, vol. 24, No. 3, pp. 1425-1432, Mar. 2006, XP-002459136.
Grossard et al., "AlGaAs-GaAs Polarization Converter with Electrooptic Phase Mismatch Control," IEEE Photonics Technology Letters, vol. 13, No. 8, pp. 830-832, Aug. 2001.
Hall et al., "Optical Guiding and Electro-Optic Modulation in GaAs Epitaxial Layers,"Obits Communications, vol. 1, No. 9, pp. 403-405, Apr. 1970.
Haxha et al., "Analysis of polarization conversion in AlGaAs/GaAs electrooptic polarization converter," Optics Communications, vol. 262, pp. 47-56, 2006, XP-002459135.
Heaton et al., "Optimization of Deep-Etched, Single-Mode GaAs/ AlGaAs Optical Waveguides Using Controlled Leakage into the Substrate," Journal of Lightwave Technology, vol. 17, No. 2, pp. 267-281, Feb. 1999.
Izuhara et al., "Low-voltage tunable TE/TM converter on ion-sliced lithium niobate thin film," Electronic Letters, vol. 39, No. 15, Jul. 24, 2003.
Schlak et al., "Tunable TE/TM-Mode Converter on (001)-InP-Substrate," IEEE Photonics Technology Letters, vol. 3, No. 1, pp. 15-16, Jan. 1991.
Wang et al., "High Speed III-V Electooptic Waveguide Modulators at λ=1.3 μm," Journal of Lightwave Technology, vol. 6, No. 6, pp. 758-771, Jun. 1988.

(56) References Cited

OTHER PUBLICATIONS

Mar. 31, 2009 International Search Report issued in Application No. PCT/GB2009/000190.
Mar. 31, 2009 Written Opinion issued in Application No. PCT/GB2009/000190.
May 16, 2008 British Search Report issued in Application No. GB0801408.6.
Jul. 14, 2009 International Search Report issued in Application No. PCT/GB2009/000189.
Jul. 14, 2009 Written Opinion issued in Application No. PCT/GB2009/000189.
Aug. 3, 2010 International Preliminary Report on Patentability issued in Application No. PCT/GB2009/000179.
Jun. 2, 2009 International Search Report issued in Application No. PCT/GB2009/000179.
Jun. 2, 2009 Written Opinion issued in Application No. PCT/GB2009/000179.
Apr. 24, 2008 British Search Report issued in Application No. GB0801492.0.
Jul. 28, 2009 International Search Report issued in Application No. PCT/GB2009/000186.
Jul. 28, 2009 Written Opinion issued in Application No. PCT/GB2009/000186.
May 21, 2008 British Search Report issued in Application No. GB0801395.5.
Jul. 14, 2009 International Search Report issued in Application No. PCT/GB2009/001223.
Jul. 14, 2009 Written Opinion issued in Application No. PCT/GB2009/001223.
Jul. 14, 2009 International Search Report issued in Application No. PCT/GB2009/001226.
Jul. 14, 2009 Written Opinion issued in Application No. PCT/GB2009/001226.
Jul. 6, 2009 International Search Report issued in Application No. PCT/GB2009/001222.
Jul. 6, 2009 Written Opinion issued in Application No. PCT/GB2009/001222.
U.S. Appl. No. 12/993,146, filed Nov. 17, 2010; Hicks.
U.S. Appl. No. 12/993,098, filed Nov. 17, 2010; Wiseman et al.
U.S. Appl. No. 12/992,695, filed Nov. 15, 2010; Wiseman.
May 21, 2008 British Search Report issued in Application No. GB0801406.0.
Aug. 31, 2008 British Search Report issued in Application No. GB0801406.0.
Sep. 2, 2008 British Search Report issued in Application No. GB0801406.0.
Benabid, "Hollow-core Photonic Bandgap Fibre: New Light Guidance for New Science and Technology," Philosophical Transactions of the Royal Society, 2006, pp. 3439-3462, vol. 364, Bath, U.K.
Bennett et al. "Quantum Cryptography: Public Key Distribution and Coin Tossing," International Conference on Computers, Systems & Signal Processing, Dec. 10-12, 1984, Bangalore, India.
Bennett, "Quantum Cryptography Using Any 2 Non-orthogonal States," Physical Review Letters, May 25, 1992, pp. 3121-3124, vol. 68, No. 21.
Bennett et al., "Generalized Privacy Amplification," IEEE Transactions on Information Theory, 1995, pp. 1915-1923, vol. 41, No. 6.
Gilbert et al., "Secrecy, Computational Loads and Rates in Practical Quantum Cryptography," Algorithmica, 2002, pp. 314-339, vol. 34, US.
Kanamori et al., "3 Party Quantum Authenticated Key Distribution with Partially Trusted Third Party," IEEE Communications Society, 2008, Globecom 2008 Proceedings.
Le et al. "Enhancement of AGT Telecommunication Security using Quantum Cryptography," Ecole Nationale Superieure des Telecommunications, Eurocontrol CARE Project, QCRYPT, France.
Lütkenhaus, "Estimates for Practical Quantum Cryptography," Helsinki Institute of Physics, Feb. 1, 2008, Pp. 1-26, Helsinki, Finland.
Aug. 13, 2008 Search Report issued in International Application No. GB0809038.3.
Aug. 13, 2008 Search Report issued in International Application No. GB0809044.1.
Aug. 14, 2008 Search Report issued in International Application No. GB0809045.8.
Jan. 23, 2009 Search Report issued in International Application No. GB0819665.1.
Mar. 18, 2009 Search Report issued in International Application No. GB0822356.2.
Mar. 16, 2009 Search Report issued in International Application No. GB0822254.9.
Mar. 16, 2009 Search Report issued in International Application No. GB0822253.1.
Jan. 25, 2010 Search Report issued in International Application No. GB0917060.6.
Jun. 29, 2010 Search Report issued in International Application No. GB0917060.6.
May 16, 2008 Search Report issued in International Application No. GB0801408.6.
Apr. 24, 2008 Search Report issued in International Application No. GB0801492.0.
May 21, 2008 Search Report issued in International Application No. GB0801395.5.
May 21, 2008 Search Report issued in International Application No. GB0801406.0.
Aug. 31, 2008 Search Report issued in International Application No. GB0801406.0.
Sep. 2, 2008 Search Report issued in International Application No. GB0801406.0.
Mar. 25, 2010 Search Report and Written Opinion issued in International Application No. PCT/GB2009/002543.
Jan. 4, 2010 Search Report and Written Opinion issued in International Application No. PCT/GB2009/002745.
Sep. 30, 2010 Search Report and Written Opinion issued in International Application No. PCT/GB2009/002802.
Apr. 20, 2010 Search Report and Written Opinion issued in International Application No. PCT/GB2009/002801.
May 31, 2012 Search Report and Written Opinion issued in International Application No. PCT/GB2011/001670.
Aug. 15, 2012 Office Action issued in U.S. Appl. No. 12/863,483.
Aug. 1, 2012 Office Action issued in U.S. Appl. No. 12/993,098.
Sep. 12, 2012 Office Action issued in U.S. Appl. No. 12/863,509.
U.S. Appl. No. 13/496,324 in the name of Ayling, filed Mar. 15, 2012.
U.S. Appl. No. 12/863,509 in the name of Jenkins, filed Jul. 19, 2010.
U.S. Appl. No. 13/130,944 in the name of Benton, filed May 24, 2011.
U.S. Appl. No. 13/130,897 in the name of Wiseman, filed May 24, 2011.
U.S. Appl. No. 13/130,790 in the name of Wiseman, filed May 24, 2011.
U.S. Appl. No. 13/125,735 in the name of Wiseman, filed Apr. 22, 2011.
U.S. Appl. No. 12/863,483 in the name of Wiseman, filed Jul. 19, 2010.
Sep. 21, 2012 Office Action issued in U.S. Appl. No. 12/863,509.
Oct. 4, 2012 Office Action issued in U.S. Appl. No. 12/992,695.
Oct. 29, 2012 Office Action issued in U.S. Appl. No. 12/993,146.
Nov. 9, 2012 Office Action issued in U.S. Appl. No. 13/130,790.
Aug. 29, 2013 Office Action issued in U.S. Appl. No. 12/992,695.
Sep. 12, 2013 Office Action issued in U.S. Appl. No. 13/130,897.
Sep. 18, 2013 Office Action issued in U.S. Appl. No. 12/812,849.
Ibrahim et al. "Simulation of Static Optical XPM in Active MMI Couplers" (published in International Conference on Numerical Simulation of Optoelectronic Devices, Sep. 2007).
Jul. 3, 2013 Office Action issued in U.S. Appl. No. 12/993,098.
Jun. 28, 2013 Office Action issued in U.S. Appl. No. 13/130,790.
Jun. 19, 2013 Notice of Allowance issued in U.S. Appl. No. 12/993,146.
Jun. 11, 2013 Office Action issued in U.S. Appl. No. 12/863,509.
Jul. 8, 2013 Office Action issued in U.S. Appl. No. 13/496,324.
Nov. 16, 2012 Office Action issued in U.S. Appl. No. 13/130,897.
Jan. 3, 2013 Office Action issued in U.S. Appl. No. 13/125,735.

(56) References Cited

OTHER PUBLICATIONS

Jan. 18 2013 Office Action issued in U.S. Appl. No. 12/993,098.
Feb. 11, 2013 Notice of Allowance issued in U.S. Appl. No. 12/863,483.
Mar. 13, 2013 Office Action issued in U.S. Appl. No. 12/992,695.
Apr. 11, 2013 Office Action issued in U.S. Appl. No. 13/130,944.
May 10, 2013 Office Action issued in U.S. Appl. No. 13/130,897.
Lijun MA, "Experimental Demonstration of an Active Quantum Key Distribution Network with Over Gbps Clock Synchronization," IEEE Communications Letters, vol. 11, No. 12, Dec. 2007, pp. 1019-1021.
Nov. 7, 2013 Office Action issued in U.S. Appl. No. 12/993,098.
Apr. 7, 2014 Office Action issued in U.S. Appl. No. 12/812,849.
Feb. 19, 2014 Notice of Allowance issued in U.S. Appl. No. 12/992,695.
Fling, Chi-hang Fred et al. "Security proof of quantum key distribution with detection efficiency mismatch," Jan. 2009, pp. 131-165, vol. 9, No. 1&2, Rinton Press.
Mar. 25, 2014 Office Action issued in U.S. Appl. No. 12/863,509.
John P. Barber; Integrated hollow and solid-core waveguides for sensor platforms; Year:2005; OSA/IPRA; p. 1-3.
Jan. 17, 2014 Notice of Allowance issued in U.S. Appl. No. 13/130,944.

* cited by examiner

QUANTUM CRYPTOGRAPHY APPARATUS

This invention relates to apparatus and method for performing quantum cryptography, especially quantum key distribution, between two endpoints without the need for an uninterrupted optical link between the endpoints.

Encryption is commonly used to protect communications over a variety of media, especially communication networks and/or data networks. Encryption is generally based on the parties who wish to protect their communication sharing some secret value. This value may be used to derive a cryptographic key which is used to protect the communication. The more sophisticated the encryption the harder it is to decode without the key—it is generally believed that breaking modern, well administered encryption schemes would require vast conventional computing resources. It is well known however that using the same cryptographic key repeatedly for different communications gives a possible codebreaker more material to work with and potentially introduces vulnerabilities into the encryption. Therefore changing the cryptographic key often is desirable.

Obviously distributing new key material securely is vital as, with knowledge of the key, an eavesdropper can decrypt all communications. Key distribution must also be efficient and convenient however, for instance physical delivery of new keys by trusted courier or the like, is expensive and impractical for many situations.

New key material may be distributed by encrypting it using the existing key and then distributing as normal data traffic. The new key material can then be used for subsequent communications—including, at some point, another new key. Such a scheme is convenient and allows regular key update but it has a weakness in that if the encryption is broken at any point, i.e. the encryption key is effectively determined, it fails from that point on as an eavesdropper will be able to intercept and decode the message bearing the new key when it is distributed and use that key to intercept future communications.

Quantum key distribution (QKD) is a well known technique which offers the possibility of secure key distribution. QKD relies on fundamental quantum properties and allows two parties, commonly referred to as Alice and Bob, to exchange a value and know that an eavesdropper, usually referred to as Eve, has not learnt much about the value. QKD allows key material to be securely derived by Alice and Bob as needed, which offers significant advantages over other methods of key distribution.

Bennett and Brassard described a QKD protocol in C. H. Bennett and G. Brassard, "Quantum cryptography: 'Public key distribution and coin tossing'," IEE Conf. Computers Systems Signal Processing, Bangalore, India 1984 which has become known as the BB84 protocol. This protocol uses the transmission of a suitably encoded series of single photons (a quantum exchange) followed by an open discussion via any conventional communication medium (a key agreement stage) to allow Alice and Bob to derive a shared string of random numbers. As single photons are used in the quantum exchange the only way Eve can gain any information about this exchange is to intercept the single photons sent by Alice and measure the information herself. To avoid detection she should also transmit a photon to Bob which attempts to replicate the original photon she intercepted. Due to the random choice of encoding and the quantum nature of the photons Eve can not guarantee to pass a correctly encoded photon to Bob and this will generate a statistical error which will be spotted by Alice and Bob during their conventional communication.

QKD therefore offers a secure means of distributing new key material which protects against eavesdropping. The BB84 protocol as originally described is however potentially vulnerable to a so called man-in-the-middle attack. Here an attacker, usually referred to as Mallory, positions himself so as to be able to intercept and stop all data exchange between Alice and Bob. Mallory then communicates with Alice but pretends to Alice that he is Bob. He also communicates with Bob but in doing so pretends to be Alice. Thus each of Alice and Bob think they are talking to one another but in fact they are actually both talking to Mallory. Were simple QKD protocols used in this scenario Alice would agree a quantum key, i.e. a key derived through QKD, with Mallory (thinking it was Bob). Bob would likewise agree a quantum key with Mallory. Alice, thinking she had agreed a quantum key with Bob would encrypt a message meant for Bob with this key. Mallory could intercept this communication, decrypt it and take any information he wants from the message. To avoid detection he can then re-encrypt this message, this time using the quantum key agreed with Bob, and transmit it onward to Bob. Bob would therefore receive the message which was actually sent by Alice and it would be encrypted using the key he thinks he has agreed with Alice. Bob would therefore not realise anything was wrong. Communications from Bob to Alice would follow the same principle in reverse order. Alternatively Mallory could alter the message from Alice to Bob and thereby create an apparently authentic forged message.

To overcome the man-in-the-middle attack it is usual for the communicating parties to undertake an authentication step to ensure that Alice is indeed talking to Bob and not to Mallory. Authentication usually involves revealing or using a shared secret, such as an identity key, which is known only to Bob and Alice. Alice, wishing to communicate with Bob, would attempt to contact Bob and set up a quantum key. In doing so she requests authentication based on Bob's identity key. Mallory would not know this and hence could not successfully pretend to be Bob. Similarly Bob, receiving a request to set up a quantum key with someone purporting to be Alice, would request authentication based on Alice's identity key. Authentication does require Alice and Bob to share knowledge of at least one identity key prior to commencing QKD but this key can be supplied once on initialisation of the system. In use the identity key can then be updated using a quantum key derived from an authenticated QKD session.

Authenticated QKD therefore offers secure key distribution. QKD as described however requires an uninterrupted optical path from Alice to Bob to act as a quantum channel. This may be in free space or through an optical waveguide such as a fibre optic cable. In either case distances are limited, not least due to the use of single photons.

One way of overcoming this limitation would be to form a chain of nodes, each node being connected to the next node by an optical link over which QKD can be applied. Alice would be the first node in the chain and Bob the last. Each node could then establish a quantum key by QKD with its neighbours. The key established by a pair of nodes would then be used to encrypt data traffic passing between those nodes. In this way a message passing along the chain is encrypted between nodes, though a different key is used on each link. This provides protection against Eve attempting to eavesdrop on any link. However it will be clear that the data is in the clear, i.e. unencrypted, within a node and hence it is necessary to protect against Mallory pretending to be a node in the chain. This requires each node to authenticate the adjacent nodes in the chain.

Whilst such an arrangement is possible it does require Alice and Bob to trust the nodes to authenticate correctly.

Also it requires each node to know its own identity key and the identity keys of the previous and subsequent nodes in a chain. As the skilled person will appreciate, the nodes must be physically secured, i.e. proof against leaking data accidentally and also in a secure location and/or tamper proof. Tamper proofing of such devices often involves locating it in a screened container which, if opened, causes the node to irretrievably delete all keys known to it. This occurs if an attacker attempts to open the container but also if the container is opened for routine maintenance. After maintenance a new identity key is loaded into the node which it can then use to communicate with its adjacent node. However these nodes will not recognise the new identity key unless they have also been physically supplied with it. It will be apparent then any maintenance carried out on a node, or replacement of a node in the chain, will require an engineer to not only visit that node but also the locations of the two adjacent nodes This represents an additional management overhead which should be avoided if possible.

An alternative arrangement is disclosed in US patent application US2004/0184603, Pearson and Elliot. Here nodes are dynamically picked from a network to form a chain from Alice to Bob and QKD is used between each node to generate a quantum key for that link. However, unlike the arrangement described above, traffic data is not sent through the chain encrypted with a different quantum key on each link. Instead each intermediate node in the chain combines the quantum keys it shares with the nodes either side via an XOR function and passes the result to Alice via conventional communication methods. Bob, the last node in the chain, generates a traffic key and combines this with the quantum key established with the previous node and sends this to Alice. Alice can combine the data sent by each of the nodes in the chain together with the quantum key she agreed with the node adjacent to her to recover the traffic key. The traffic key can then be used for end-to-end encryption between Alice and Bob. In effect each node sends Alice the quantum key for the subsequent link encrypted with the key for the previous link. As Alice herself knows the quantum key for the first link she can use this to decode the key for the second link which can be used to decode the key for the third link and so on till she knows the quantum key for the last link which Bob had used to encrypt the traffic key.

Eve monitoring the traffic in such a system will be able to combine the data sent by each node to generate a value which is equal to the traffic key combined with the quantum key for the first link by an XOR function. As Eve does not know that quantum key she can't know the traffic key and hence the system is secure against eavesdropping. Whilst the data traffic is sent using end-to-end encryption—and hence does not appear in the clear at any node—any node could derive the traffic key by simply collecting all the messages sent by conventional means by each subsequent node in the chain and combining them via an XOR function. Hence the system is still vulnerable to Mallory pretending to be a node and thus each node must authenticate the next node in the chain to maintain security. This need for nodes to authenticate each other has the same disadvantages as described above.

Another technique is disclosed by Bechmann-Pasquinucci and Pasquinucci in their paper entitled "Quantum key distribution with trusted quantum relay". Here Alice and Bob at the end point nodes communicate via an intermediate node, Trent. Trent has a quantum receiver that receives the quantum signal from Alice and a quantum transmitter that attempts to regenerates the quantum signal which passes to Bob. In effect Trent attempts to act as an automatic relay or signal booster. As however Trent can not guarantee to regenerate the quantum signal accurately—which is fundamental to the security of QKD—all three parties, Alice, Trent and Bob must discuss the bases used to generate and measure the photons in the key agreement stage. Only if all three agree is the bit retained. The algorithm generalises to chains with more than three nodes in an obvious fashion.

The paper makes it clear that Trent must be trusted, because it has all information necessary to derive the key that Alice and Bob establish. The paper does not discuss the need for authentication to exclude man-in-the-middle attacks, but it is clear that Alice and/or Bob must authenticate Trent otherwise a man-in-the-middle attacker, Mallory, could replace it.

One drawback of this solution is that losses increase exponentially with the number of nodes in the chain, because Bob and each Trent must all guess the base used by Alice correctly. This problem is compounded by a practical problem with current quantum transmitters. The transmitter must be a single photon source otherwise Eve can intercept one photon and leave another unobserved to pass to Bob. One practical means of producing single photon sources is to use low power lasers which statistically have a very low probability of producing multiple photons, but have quite a high probability of producing none. Thus the quantum transmitters are a large source of loss in the quantum signal. For example, Alice might attempt to send photons at a rate of 10 Mbit/second, but on average only 1 Mbits are actually sent every second. Trent must receive and then resend these using a single photon source, so actually only sends 100 kbits every second. This greatly reduces the rate at which keys can be established, and the losses soon become so high that it is no longer practical to establish a key at all.

It is therefore an object of the present invention to provide a QKD apparatus capable of which mitigates at least some of the above mentioned disadvantages.

Thus, according to the present invention, there is provided a method of quantum key distribution, comprising a quantum exchange step and a subsequent key agreement step wherein, in the quantum exchange step, a first quantum node and a second quantum node exchange a quantum signal over a quantum link between them and wherein the first quantum node communicates with a first remote node such that the first remote node has information regarding the quantum signal transmitted and/or detected by the first node and the first remote node takes the place of the first quantum node in the subsequent key agreement step.

The present invention therefore involves a quantum signal being exchanged between a first quantum node and a second quantum node as in standard QKD methods. As used herein the term quantum node means a location in a communication chain or network which has an apparatus capable of transmitting and/or receiving a quantum signal suitable for quantum key distribution. A quantum node may be an endpoint of a communication chain or an intermediate part of the chain. A quantum signal is any signal which may be used as the basis of a quantum key agreement protocol as would be understood by one skilled in the art. For instance the quantum signal may comprise a series of suitably modulated single photons. The skilled person will be well aware of various modulation schemes which may be used, for instance phase modulation or polarisation modulation. A quantum link as used herein means a link between two quantum nodes suitable for exchange of the quantum signal. It may, for instance, comprise a free space path or a path through a suitable waveguide or waveguides such as fibre optic cable.

Unlike conventional QKD, in the method of the present invention the first quantum node does not take part in the subsequent key agreement step. Instead the first quantum node communicates with a first remote node such that the first remote node has all the information about the quantum signal needed such that it can undertake the subsequent key agreement step. As used herein the term remote node means a location remote from a quantum node which has an apparatus for conventional communications.

As an example, the quantum signal exchange may be carried out in accordance with the principles of quantum exchange set out in the BB84 protocol, i.e. the quantum signal consists of a series of single photons, each randomly modulated in terms of encoding base and data value. The first remote node communicates with the first quantum node such that the first remote node knows the encoding base applied and data value for each photon transmitted and/or detected by the first quantum node. The first remote node thus has all the information required to undertake the key agreement stage of the BB84 protocol. The skilled person will of course appreciate that the BB84 protocol is used by way of example only and other protocols exist and could be adapted to operate according to the present invention. For example, and without limitation, protocols such as the B92 protocol or six-state protocol could be adopted. It is also known that entanglement can be used in QKD. For instance a source of entangled photons may generate an entangled photon pair and one of these photons may be sent across the quantum link. Thus the quantum exchange of the quantum signal may include transfer of an entangled photon. It is possible that a source of entangled photon pairs is located remotely and one photon from each pair is provided to Alice and Bob. It will be understood by the skilled person that in such an arrangement the quantum signal exchange occurs when Alice and Bob each perform measurements on their respective photons. Hence even though a third party may generate the entangled photons the quantum exchange is still between Alice and Bob.

The first remote node conveniently performs the key agreement step with the second quantum node. The second quantum node is directly involved in the quantum signal exchange as is usual for QKD and thus can operate the key agreement stage as standard. The first remote node, through communication with the first quantum node, has all the information necessary to agree the quantum key and can do so directly with the second quantum node.

The first remote node can therefore agree a quantum key with the second quantum node even in the absence of a direct quantum link between them by using an intermediate node, i.e. the first quantum node which does have a quantum link to the second quantum node. It will be noted that as the first remote node takes part in the key agreement step the first remote node also takes part in authenticating the key exchange, i.e. it will be the identity key shared between the first remote node and the second quantum node which is used for mutual authentication. As the first remote node undertakes the key agreement step with the second quantum node directly and is involved in the authentication, if the authentication is successful the first remote node and second quantum node can use some of the shared secret value established to update their identity keys.

It will of course be apparent that the second quantum node could itself be in communication with a second remote node and communicate information regarding the quantum signal transmitted and/or received by the second quantum node. The key agreement step could then take place between the first remote node and the second remote node.

Once a quantum key has been agreed between the first remote node and the second quantum node, or second remote node as appropriate, that key can be used to encrypt communications between those nodes in an end-to-end encryption arrangement.

The present invention in effect separates the location of the quantum transmitter/receiver part of a QKD apparatus from the key agreement processing part of the apparatus. This separation is immaterial to effective operation of the protocol—but does offer advantages in terms of communication across multiple links as will be described below.

It is, of course, important that there is no eavesdropping on the communication between the first quantum node and the first remote node—otherwise an eavesdropper listening in to the key agreement step would be able to determine the quantum key. This may not be a concern in some applications, for instance if the physical or geographical arrangement of the nodes means that the link between the first remote node and the first quantum node is secure, e.g. within a secured environment, open communication on such a link would be acceptable. However in most cases it will be desirable to ensure that the communication between the first remote node and the first quantum node is protected it from eavesdropping. One way to protect the communication is to encrypt it. The encryption applied to this communication could be any type of encryption which offers the security required for the particular application and the skilled person will be well aware of a variety of encryption techniques that could be used. Conveniently however the communication between the first remote node and the first quantum node is protected by encrypting it with a quantum key derived by quantum key distribution between the first remote node and the first quantum node. In other words communications used in the present method of QKD which need protecting are themselves protected by QKD techniques. This preserves the security of QKD for the whole communication process. Of course the protection applied to the communication between the first quantum node and the first remote node could comprise a combination of physical protection and encryption. The signal may, for instance, need to pass through some components not compatible with encryption and any such components would need to be physically secured. There may also be different types of encryption applied for different parts of the journey.

Where there is a suitable quantum link between the first remote node and the first quantum node standard QKD techniques may be applied to derive the quantum key, e.g. the standard authenticated BB84 protocol may be applied between the first remote node and the first quantum node—or any other suitable QKD protocol. The method may therefore involve an initial step of deriving a quantum key between the first remote node and the first quantum node by conventional quantum key distribution.

The method therefore establishes a first quantum key for the link between the first remote node (which is itself a quantum node) and the first quantum node by standard QKD. Once this first quantum key is established encrypted communication between the first remote node and the first quantum node can occur and the method of the present invention as described above can be implemented, i.e. a quantum exchange between the first quantum node and second quantum node followed by a key agreement step between the first remote node and the second quantum node. This establishes a second quantum key for communications between the first remote node and the second quantum node.

In an alternative arrangement rather than use the first quantum key to encrypt communications between the first remote node and the first quantum node, the first quantum key could be used as data to determine the quantum signal transmitted between the first quantum node and second quantum node. As is explained in more detail below if the first quantum node transmits the quantum signal to the second quantum node during the quantum exchange step it is the first quantum node that controls the quantum signal transmitted. The first quantum node, having agreed a first quantum key, i.e. some shared secret value, with the first remote node, could therefore use that first quantum key in a predetermined way to determine the modulation to be applied in transmitting the quantum signal. Clearly the first remote node also clearly knows the first quantum key and therefore can also determine the modulation applied to quantum signal. Thus, the first remote node, in agreeing a quantum key with the first quantum node, gains the necessary information about the quantum signal to be able to take part in the key agreement step. The key agreement between the first remote node and first quantum node comprises the communication of information regarding the quantum signal exchange. This avoids the need for separate encrypted communication between the first quantum node and the first remote node. In this embodiment of the method of the present invention there is then no need for the first quantum node to handle any encrypted messages and hence there is no need for it to have any means of encrypting or decrypting messages.

It will be apparent that the methods could be iteratively repeated for further quantum links. For instance having established a second quantum key between the first remote node and the second quantum node, the method could be repeated but with the second remote node exchanging a quantum signal with a third quantum node. The second quantum key could then be used to encrypt communications with the first remote node regarding the details of the quantum exchange or, if the second quantum node is capable of transmitting a quantum signal to the third quantum node, it could be used directly by the second quantum node to determine the modulation applied in the quantum transmission. The first remote node could then perform a key agreement step with the third node to agree a third quantum key between them. The process could be repeated across subsequent quantum links in a chain until the intended endpoint is reached at which point the first remote node would have established a quantum key directly with the endpoint which can be used for end-to-end encryption.

For convenience and practicality the same type of QKD signal may be exchanged between quantum nodes during the process of agreeing a quantum key between the first remote node and each subsequent node in the chain and in each case the step of agreeing a quantum key involves the same protocol. In other words each exchange could, for instance, involve an exchange of single photons suitably modulated according to a particular QKD protocol and the key agreement step with each node would follow the relevant part of said protocol. However the method could be operated with different quantum signals being exchanged between particular nodes as appropriate. For instance the protocol could be a BB84 type protocol but the quantum exchange across one link could be of single photons modulated in polarisation whereas the quantum exchange on the next link could be modulated in phase. The principle of the key agreement step is the same so provided the correct type of quantum transmitters and receivers are used the method would work appropriately. Alternatively a two state polarisation modulation could be applied on one link and used in agreement of the key whereas a six state polarisation may be used on the next link, again with appropriate arrangement of different types of quantum transmitter and receiver. The first remote node in such an arrangement would obviously need to know the type of quantum signal exchanged and be able to follow the appropriate protocol but having used the relevant protocol to establish a quantum key with a particular quantum node that protocol need not be used again if not appropriate. The use of a different type of quantum signal on different links might be advantageous if some links are different to others, for instance if some links are free space whereas other links are fibre based.

The present invention therefore provides a method of agreeing a quantum key between two nodes linked via a series of separate quantum links. Unlike a simple chain of nodes which use a different quantum key on each link the method of the present invention allows end-to-end encryption to be applied. Further, it will be clear that as the intermediate nodes in the chain, e.g. the first and second quantum nodes, do not actually perform a key agreement step between themselves there is no need for authentication between intermediate nodes. Thus intermediate nodes in the chain do not need to know the identity codes of the adjacent nodes.

Authentication is still required between the first remote node and each intermediate node in the chain, otherwise a man-in-the-middle attacker could pretend to be a node and learn the quantum key established with that node. Knowing one quantum key would allow the attacker to determine the subsequent quantum key. However as each key agreement step involves the first remote node it can maintain the identities of each intermediate node it agrees a key with. The first remote node thus does not have to trust the intermediate nodes to authenticate correctly and replacement or maintenance of a node only requires the new identity to be provided to the first remote node, reducing maintenance overhead.

The first quantum node may comprise at least one quantum signal transmitter and/or at least one quantum signal receiver. In a standard point-to-point QKD systems the quantum exchange is one way, i.e. one endpoint has a quantum signal transmitter and the other endpoint has a quantum signal receiver. It is possible however to perform two way quantum exchange across a single link, for instance to increase data rates, and therefore each endpoint may have a quantum signal transmitter and a quantum signal receiver. Where the first quantum node is arranged for quantum exchange on two or more separate quantum links, e.g. when it is part of a chain or network it will have a separate quantum link with each adjacent node, it may have a separate quantum detector or quantum receiver or both for each quantum link.

Conveniently the first quantum node comprises a quantum transmitter for transmitting a quantum signal to the second quantum node and the second quantum node comprises a quantum receiver for receiving the quantum signal from the first quantum node. In this case the communication between the first remote node and the first quantum node may involve the first quantum node sending information about the modulation applied to the quantum signal to the first remote node. In other words the quantum transmitter determines itself how to modulate the quantum signal—for example based on the output from at least one random number generator—and transmits this information to the first remote node. Alternatively the first remote node could send to the first quantum node information regarding how the quantum signal should be modulated, i.e. the first remote node determines the modulation to be applied and transmits this data to the first quantum node. The method may therefore comprise the step of transmitting a string of random numbers from the first remote node to the first quantum node and using the string of random numbers at the first quantum node to determine the quantum signal transmitted. In such an embodiment the quantum transmitter at the first quantum node need not have its own random number generator. Obviously sufficient data should be transmitted to generate a quantum signal long enough to derive a key of the desired length—the skilled person will readily understand that deriving a quantum key consisting of a certain number of bits requires significantly more bits to be transmitted in the quantum signal to account for incorrect measurement choices, losses and privacy amplification etc. The method may therefore involve transmitting a random number string from the first remote node to the first quantum node and using the transmitted random number string as the seed in a pseudo-random number generator. Pseudo-random number generators are well known and use predetermined algorithms to act on a seed string of bits to produce a longer string of bits which has the properties of a random number over a certain length. However the same seed always produces the same output. Thus the first remote node can produce a random number string and transmit it to the first quantum node. The first quantum node can then use this random number string as the seed for a pseudo-random number generator to produce a longer string for modulating the quantum signal. The first remote node can also use the random number string as the input to an identical pseudo-random number generator to produce the same longer string which it knows was used to modulate the quantum signal.

For completeness it is of course possible that the first remote node transmits some data to the first quantum node which is used to modulate the quantum signal but the first quantum node also determines some aspects of the modulation itself and thus communicates those details to the first remote node, entailing a two way communication.

Alternatively, as mentioned above, where the first quantum node has agreed a first quantum key with the first remote node the first quantum key itself could be used to determine the modulation applied to the quantum signal. The first quantum key could be used directly to determine the modulation, i.e. the first quantum key, which in effect will be a string of random numbers, is used directly to determine the modulation applied. As mentioned above however in QKD the number of bits transmitted in the quantum signal is much greater than the number of bits in the resulting key. Therefore the first quantum key would have to be long enough to allow for enough bits in the quantum signal to be transmitted to allow the first remote node and second quantum node to establish a second quantum key of the desired length. The first quantum key could therefore be used to seed a pseudo random number generator to generate a random sequence which is used as the basis for modulating the quantum signal. The use of pseudo random number generators allows the method to be applied on multiple hops between several nodes without requiring unduly long quantum keys to be established in the early stages.

In an alternative arrangement the first quantum node may comprise the quantum receiver and the second quantum node comprises the quantum transmitter. In this arrangement obviously the receiver has to detect the received quantum signals and so will inevitably generate data which must be transmitted to the first remote node. However depending on the type of receiver used there may be a need to actively choose random encoding bases to apply to the received quantum signal. This choice may depend, for instance, on the output of a random number generator. According to the method of the present invention the quantum receiver could generate its own random numbers to use for determining the choice of encoding base and transmit this data to the first remote node or the first remote node could generate the random numbers to be used for the choice of encoding base, or a seed for a pseudo-random number generator, and transmit this data to the first quantum node.

The method of the present invention therefore allows two parties that wish to communicate, Alice and Bob say, to derive a quantum key for use for communications between them even though there may not be a suitable quantum link between them. The method effectively allows Alice to talk to an intermediate node which does have a quantum link to Bob and to either tell the intermediate node what quantum signal to send or get the intermediate node to tell Alice what quantum signal has been sent by or received at that node so that Alice can undertake the key agreement step with Bob directly. Unlike other known methods the present invention does not rely on intermediate nodes authenticating each other nor does it involve the intermediate node in the actual key agreement step.

As described above each quantum exchange step between a particular transmitter and receiver may be performed using known QKD techniques. Thus known techniques improving the efficiency or security of the exchange, use of decoy states and the like for instance, may be used as appropriate. Provided all necessary details of the quantum signal exchanged are provided to the first remote node it can agreed the key and apply any additional security enhancements as if it has sent or received the quantum signal itself.

The present invention therefore allows operation of a series of quantum links with at least one control node in the series, which may be an endpoint, being arranged to control each intermediate node. The series may be a fixed chain of devices or could be dynamically selected from a network. Thus in another aspect of the invention there is provided a serial quantum key distribution system comprising a control QKD device linked in series, via at least one intermediate QKD device, with an endpoint QKD device wherein each QKD device has at least one quantum transmitter and/or receiver arranged to exchange a quantum signal with an adjacent QKD device, wherein each intermediate QKD device comprises a crypto-unit for communicating information regarding the quantum signal transmitted to or received from the subsequent QKD device in the series with a crypto-unit at the control QKD device and wherein the control QKD device is arranged to agree a quantum key with each QKD device in the series in sequence.

The present invention therefore provides a multi-hop method of quantum key distribution wherein one apparatus acts as a control device and agrees a quantum key with each QKD device in the series in turn until a quantum key has been agreed with required endpoint as described above with respect to the first aspect of the invention. This final quantum key can then be used to encrypt conventional end-to-end communications between the control QKD device and the endpoint QKD device. The QKD devices are all linked by standard communication means and the quantum links between adjacent QKD devices and standard communication links between the devices may be carried over a common medium. The links could be free space links or waveguide links, for example fibre optic cable, and the conventional communications and quantum signals may have different wavelengths. Communication between the crypto-units may also occur via the same links and may operate at the same or different wavelength to the other conventional communications. The term crypto-unit as used herein means a device for encrypting communications and transmitting the encrypted communication via any conventional means and/or receiving encrypted communications and decrypting them using a cryptographic key.

Each QKD device, i.e. each of the control QKD device, at least one intermediate QKD device and the endpoint QKD device, has at least one quantum transmitter and/or receiver.

As mentioned above, usually on any given quantum link, one end will have a quantum transmitter and the other end will have a quantum receiver, i.e. there will be a one way exchange of a quantum signal. For the intermediate QKD devices, which exchange a quantum signal with both a previous QKD device and a subsequent QKD in the series, a single transmitter or receiver could be arranged to communicate with both adjacent devices in sequence, for instance by using a splitter/recombiner (although this may result in a loss of signal when using a single transmitter) or an optical switch. In such an arrangement, or were some intermediate devices to comprise multiple receivers only with others having multiple transmitters only, adjacent QKD devices would have to be arranged to alternate in terms of having quantum transmitters or receivers—which may cause problems in adding an additional QKD device into the series. Conveniently therefore each intermediate device has at least one quantum transmitter and at least one quantum receiver. Conveniently the quantum transmitter is arranged to transmit a quantum signal, for example a series of suitably modulated single photons, to one of the adjacent QKD devices in the series and to receive a quantum signal transmitted by the other adjacent QKD device. Each intermediate QKD device could then be arranged to transmit to a previous device in the series and receive from a subsequent device in the series or vice versa. The control and endpoint QKD devices would obviously have to be similarly arranged to be able to transmit or receive a quantum signal appropriate from their adjacent intermediate QKD device.

Conveniently the intermediate QKD devices are arranged to receive a quantum signal from the previous QKD device in the series and to transmit a quantum signal to the subsequent QKD device in the series. In this embodiment each intermediate QKD device may conveniently be arranged to use information transmitted from the control QKD device, via the crypto-units, to modulate the transmitted quantum signal.

As described above in relation to the first aspect of the invention the transmission of the quantum signal usually involves modulating the signal in response to the output of one or more random number generators. According to the present invention the control QKD device may generate a random number and transmit it to one or more of the intermediate QKD devices to be used as basis for the modulation of the quantum signal to be transmitted by that intermediate QKD device. This removes the need for such an intermediate QKD device to have its own random number generator supplying the quantum transmitter.

To reduce the amount of encrypted data transmitted between the control means and a intermediate QKD device, both the control QKD device and at least one intermediate device may comprise identical pseudo-random number generators. The control QKD device is then adapted to generate and send, via the crypto-unit, a seed random number to the relevant intermediate QKD device. The intermediate QKD device is arranged pass the seed random number received and decrypted by its crypto-unit to the pseudo-random generator. The output of the pseudo-random number generator is then passed to the quantum signal transmitter for modulation of the quantum signal.

The quantum transmitter of the QKD device may incorporate a random number generator which is used in making a choice of encoding base applied to incident photons. However some quantum receivers, for instance that described in U.S. Pat. No. 6,028,935 apply encoding base automatically and hence avoid the need for random number generators. The present invention therefore enables an intermediate QKD device which does not include a random number generator. This not only reduces component cost and complexity but the skilled person will appreciate that ensuring sufficient randomness of modulation of the quantum signal is important for ensuring security and thus the present invention removes the need for the control QKD device operator to trust the randomness of the intermediate QKD devices.

It will be apparent the control QKD device takes over from an intermediate QKD device the step of establishing the quantum key with the next device in the series. Thus the quantum transmitter need only be connected to the crypto-unit, via the pseudo random number generator if present. There is no need for any control processor within the intermediate QKD device to be connected to the quantum transmitter. In effect the control processor present in the control QKD device is connected to the transmitter, via the encrypted link. It will be apparent however that the intermediate QKD device does however have to first agree a quantum key with the control QKD device based on the quantum signal received from the previous QKD device in the series. Thus there is a need for the intermediate QKD device to have local control logic or a controller processor, which acts on the output from the quantum receiver and communicates via conventional means with the control QKD device to establish a quantum key. This quantum key, once established can be loaded into the intermediate QKD device's crypto-unit.

Obviously the same considerations apply if the intermediate QKD devices are arranged to transmit to a previous QKD device and receive from a subsequent QKD device in the series.

In another aspect of the invention, when a previous quantum key is used to determine the modulation of the quantum signal exchange there is provided a serial quantum key distribution apparatus comprising a control QKD device linked in series, via at least one intermediate QKD device, with an endpoint QKD device wherein each intermediate QKD device comprises at least one quantum transmitter arranged to transmit a quantum signal to the next QKD device in the series and at least quantum receiver arranged receive a quantum signal from a previous QKD device in the series wherein the control QKD device is arranged to agree a quantum key with each QKD device in the series in sequence and each intermediate QKD device uses said quantum key agreed with the control QKD device to determine the modulation to be applied to the quantum signal transmitted to the next QKD device in the series. Conveniently each intermediate QKD device comprises a pseudo random number generator and is adapted to use said quantum key agreed with the control QKD device as a seed in said pseudo random number generator to determine the modulation to be applied to the quantum signal transmitted to the next QKD device in the series.

It will be clear from the foregoing that the present invention allows use of intermediate QKD devices which are, in effect, controlled remotely. In another aspect of the invention therefore there is provided an intermediate QKD device comprising a quantum signal transmitter wherein the quantum signal transmitter is arranged to modulate the quantum signal in response to data received from a remote device. The intermediate QKD device may comprise a crypto-unit and the data received from the remote device is data output from the crypto unit. Alternatively the data received from the remote device may be a quantum key agreed with said remote device. The intermediate QKD device may further comprise a pseudo-random number generator arranged to expand the data received from the remote device and the quantum transmitter uses the expanded data.

The apparatus of the present invention can be seen as a distributed quantum key distribution apparatus. Hence in another aspect of the invention there is provided a distributed quantum key distribution system comprising a first apparatus comprising a quantum signal exchange means and a second apparatus comprising a control unit arranged to determine a quantum key based on the quantum signal transmitted or received by the quantum signal exchange means of the first apparatus wherein the first apparatus is located remotely from the second apparatus. The control unit is thus located remotely from the quantum signal exchange means. In other words the first apparatus and second apparatus are not at the same location, for instance the second apparatus, i.e. the control unit, may be located 100 m or more, or 500 m or more, or 1 km or more from the first apparatus, i.e. quantum signal exchange means. The quantum signal exchange means may be a quantum signal transmission device, for instance a modulated single photon source or arrangement of sources, or a quantum receiver device, for instance an arrangement of single photon detectors, or a device capable of transmitting and receiving a quantum signal over a quantum link.

The control unit is arranged to determine a quantum key based on the quantum signal transmitted or received by the quantum signal exchange means. Hence the control unit of the second apparatus is in communication, via any conventional means, with the quantum signal exchange means of the first apparatus and preferably is arranged to undertake encrypted communication with the quantum signal exchange means of the first apparatus. Both the first apparatus and the second apparatus may therefore further comprise a crypto-unit for encrypted communication between the first and second apparatus.

As a further variant, the intermediate nodes could perform the key sifting process, with the rest of the Key Agreement logic being performed by the originating Alice equipment.

The invention will now be described by way of example only with respect to the following drawings, of which.

Figure 1:
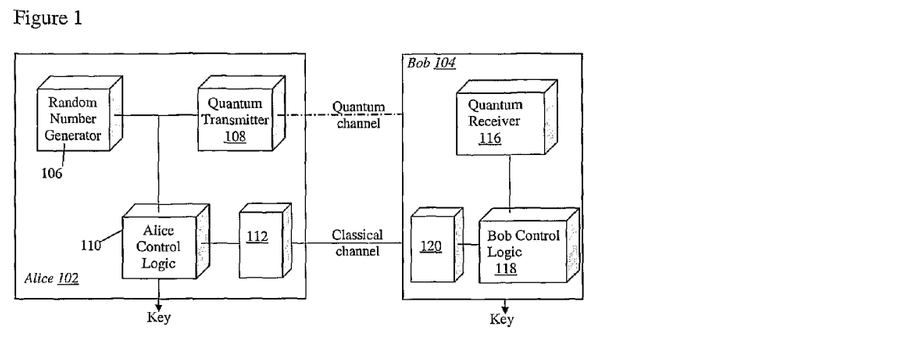
FIG. 1 shows a schematic of a standard QKD transmitter (Alice) and receiver (Bob) arranged over a single optical link.

Referring to FIG. 1 the basic structure of a standard QKD system is shown. The quantum transmitter 102, typically referred to as Alice, is optically linked to the quantum receiver 104, typically referred to a Bob. The optical link may be through free space or any suitable waveguide but for illustration will be described herein as being a fibre optic link. A typical Alice unit compromises a random number generator 106, quantum transmitter 108, controlling logic 110 and classical transceiver 112. The quantum transmitter 108 produces a series of single photons, each photon being randomly encoded using a value produced by the random number generator. The skilled person will readily appreciate that there are a number of different known encoding protocols and a number of suitable transmitters which could be used for QKD and hence these aspects will not be described further. For the purposes of this description a BB84 type protocol will be assumed wherein one of two encoding bases is chosen at random for each photon and the photon is randomly encoded with a data value of 1 or 0 in the chosen encoding base. The data regarding the applied encoding base and data value for each photon is passed to the Alice control logic 110.

The series of encoded single photons are transmitted through the fibre optic to the Bob unit 104. A typical Bob unit comprises a quantum receiver 116 which randomly chooses an encoding base with which to measure the photon and then determines a data value for the photon in the chosen base. The output of the quantum receiver 116, which indicates the applied encoding base and measured value for each detected photon is passed to Bob control logic 118.

Alice control logic 110 and Bob control logic 118 then communicate with each other via classical transceivers 112 and 120 respectively to establish a common shared key as is well known. Note as used herein the term logic means any suitable device arrangement for performing the key agreement protocols. The control logic may be a suitable designed ASIC or a suitably programmed FPGA. The control logic could also be a suitably programmed microprocessor.

In establishing a common shared key, Alice control logic 110 and Bob control logic 118 mutually authenticate each other in order to exclude the possibility of a man-in-the-middle attack. Such authentication is a well known procedure and may, for example, involve the two parties applying digital signatures to the messages they exchange. The digital signatures are generated and validated by means of a cryptographic key referred to as the identity key for the link. This may be based on symmetric cryptographic techniques in which case the identity key is a secret value known only to both parties.

Having used QKD to establish a new common shared key value, and mutually authenticated each other, Alice control logic 110 and Bob control logic 118 use that value in part to update the secret identity key and in part as an encryption key for protecting subsequent communication between them.

QKD as described in relation to FIG. 1 is a well known technique but has the limitation that it only operates over a direct optical link between Alice and Bob. Further the distance of that link is limited due to losses inherent in using single photon signals issues such as polarisation mode dispersion in the optical fibre potentially destroying the encoding of the photons.

Figure 2:
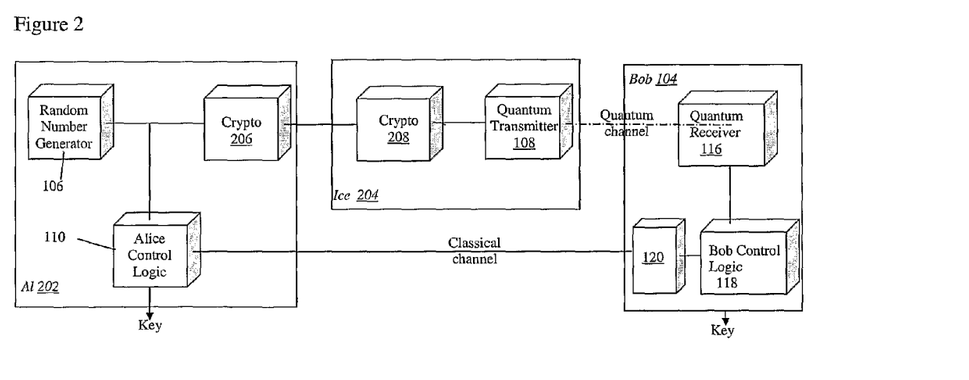
FIG. 2 shows a distributed QKD transmitter according to the present invention.

The present invention therefore provides a distributed QKD apparatus. A distributed Alice device is shown in FIG. 2 in which like components are given the same reference numerals as in FIG. 1. The device consists of two parts, a first part 202 which will be referred to herein as an Al device and a second part 204 which will be referred to as an Ice part (so that the two parts together form an Alice). The Al and Ice devices 202, 204 are located and operated in separate locations which could be different parts of the same room, different rooms in the same building or in different buildings. Indeed the separation between the Al and Ice devices 202, 204 could be anything from a few meters to hundreds or thousands of kilometers.

The Al device comprises a random number generator 106 and Alice control logic 110 as in a standard Alice device. A standard quantum transmitter 108 is located in the Ice unit. Random numbers generated by the random number generator 106 are passed to the quantum transmitter 108, via crypto 206 in the Al unit and crypto 208 in the Ice unit. As the skilled person will understand a crypto is a device for encrypting or decrypting communications. The cryptos 206, 208 therefore protect the communication of the random numbers from the Al unit to the Ice unit from eavesdropping. There are a variety of readily available crypto-units that could be used as the skilled person will be well aware. The crypto-unit may be implemented in ASIC or FPGA form and arranged to use the key in the AES encryption standard for example. Suitable FPGA or ASIC implementations of AES can be obtained, for example from Helion Technology Limited of Cambridge, England.

In the distributed device shown in FIG. 2 the quantum transmitter 108 therefore receives the random numbers from the random number generator 106 as in normal QKD. These random numbers are used to encode the single photon signals generated and transmitted to Bob as in standard QKD. The Bob unit 104 in this embodiment is identical to the Bob unit described with reference to FIG. 1.

The random numbers generated by the random number generator 106 are also passed to the Alice control logic 110 as described with reference to FIG. 1. Hence the Alice control logic 110 is fully aware of the modulation applied to each photon by the quantum transmitter 108, even though they are separated. The Alice control logic can therefore communicate with the Bob control logic and establish a quantum key as normal. This key will, of course, be known at the location of the Al unit. Hence the distributed quantum key transmitter shown in FIG. 2 allows the Al unit to agree a quantum key with the Bob unit even in the absence of a quantum link between the Al unit and Bob.

The transport of the random numbers from the Al unit to the Ice unit must be secure for the final quantum key established to be secure. Were an eavesdropper to know the random numbers supplied to the quantum transmitter they could determine the modulation of each photon sent and would subsequently be able to determine the quantum key by eavesdropping on the subsequent classical discussions between the Alice control logic and Bob control logic. It is of course possible that geographical or physical security measures protect the link from the Al unit to the Ice unit and so no encryption is required but in general encryption will be important. The crypto units 206, 208 should therefore be loaded with an encryption key used to protect the transport of the random numbers and in accordance with general security practices this encryption key should be updated regularly. QKD may therefore be used to generate and distribute suitable keys.

Figure 3:
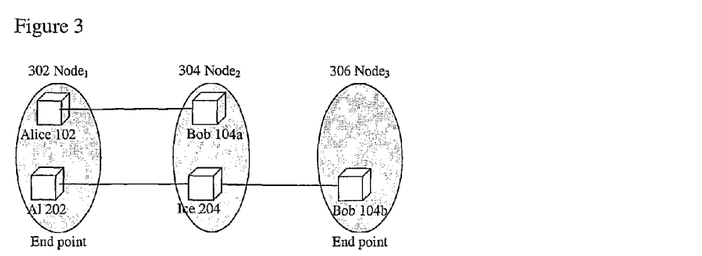
FIG. 3 illustrates the principles of multi-stage QKD according to the present invention.

To use QKD an Alice and Bob are associated with the Al and Ice units. FIG. 3a shows one embodiment where an Alice is associated with an Al unit and a Bob with the Ice unit. Again, and throughout this description, like components will be given the same numerals as used in earlier figures.

FIG. 3 shows a first node 302 which contains an Al unit 202 as described with reference to FIG. 2 co-located with an Alice unit 102 as described with reference to FIG. 1. A second node 304 which is geographically distant contains an Ice unit 204 and a Bob unit 104a. A third node 306 which is again geographically distant contains another Bob unit 104b. For clarity the Bob units in the second and third nodes will be referred to as 104a and 104b respectively even though they can both be identical to the general Bob described with reference to FIG. 1. The Alice unit 102 in the first node 302 has both a quantum link and a classical communication link with the Bob 104a in the second node. The Al unit in the first node has an encrypted classical communication channel with the Ice unit in the second node and also a classical communication channel with the Bob 104b in the third node. The Ice unit 204 has a quantum link to the Bob 104b in the third node. Of course the classical and quantum channels may be implemented as different wavelengths on fibre links and it doesn't matter if the classical channels pass over multiple links.

In use the Alice unit 102 at the first node transmits a series of encoded single photons to Bob 104a at the second node as in standard QKD and then Alice 102 and Bob 104a then agree a quantum key as standard. Once Alice 102 and Bob 104a have agreed a key Alice loads it to crypto unit 206 (not shown in FIG. 3) of the Al unit 202 and Bob 104a loads it into crypto 208 (also not shown in FIG. 3) of the Ice unit. The random number generator of the Al unit can then generate a series of random numbers which are passed to the control logic of the Al unit and also to Ice unit 204 via the crypto units. This transmission is therefore protected by a key derived by QKD and is secure. The Ice unit 204 uses the decrypted random numbers to encode the transmission on the quantum channel to Bob 104b. The control logic of the Al unit 204 can then discuss the quantum signal transmitted by Ice unit 204 and agree a quantum key. As a result of this process the first node and third node share a quantum key which can be used for end-to-end encryption between the nodes.

It should be noted that whilst node 1 is shown as having an Al unit and an Alice unit for ease of explanation in practice there would not be a need for the full functionality of an Alice unit in addition to an Al unit and instead the Alice unit would most likely be an Ice type unit, but because the Al unit and Ice unit within the same node are presumably secure there would be no need for crypto units for intra-node Al to Ice data transfer.

This method of the present invention can be applied repeatedly to form longer chains. It will be apparent that having established a quantum key for communications between the first and third nodes this could be used to transport some new random numbers to an Ice unit located at the third node which would be used to modulate a quantum signal transmitted to a fourth node. The first node could then agree a quantum key with the fourth node. In general a quantum key is established between the first node and a node N and these are then used to form a new distributed Al-ice that establishes a key with a Bob in node N+1.

Note that the quantum signal that is sent by the Ice subsystem of an intermediate node is received using a classical communication channel. Thus, unlike with the prior art Trent solution discussed in the introduction, there is no compounding of losses due to guessing bases or the efficiency of single photon transmitters.

Figure 4A:
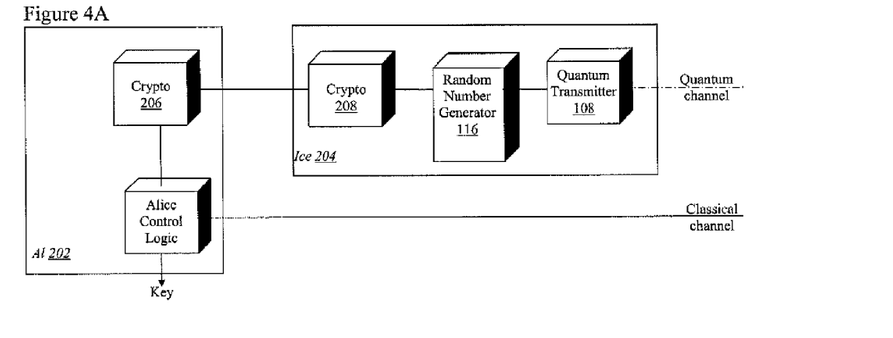
FIG. 4A shows an alternative form of Alice distribution and FIG. 4B shows an alternative form of Bob distribution.

Whilst the use of a single random number generator located within the Al unit is particularly advantageous as it avoids the need for random number generators in the Ice units there are other arrangements that are possible. For instance FIG. 4a shows a distributed Alice arrangement in which the random number generator 106 is located in the Ice unit. In this case the random numbers are generated locally in Ice unit and transmitted to the Alice control logic 110 via the crypto units 208, 206. The Alice control logic then still receives the random numbers and can use them in agreeing a quantum key with the Bob control logic in exactly the same way as described above.

Figure 4B:
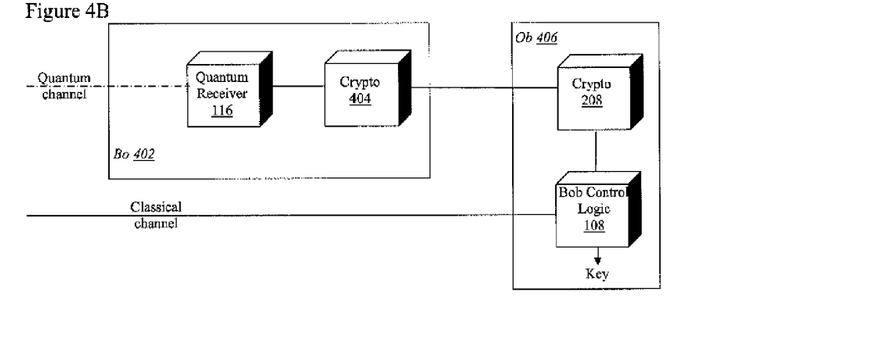

Further it is possible to form a distributed Bob arrangement as shown in FIG. 4b. Here a Bo unit 402 comprises a quantum receiver 116 arranged to receive photons on a quantum channel and a crypto 404 and a geographically separate Ob unit 406 comprises another crypto 408 and Bob control logic 118. Data received by the quantum receiver 116 is encrypted by crypto 404 and transmitted classically to the Ob unit where crypto 408 decrypts it and passes it to the Bob control logic. The Bob control logic can then communicate with an Alice control logic responsible for sending the photons on the classical channel and agree a key directly with the Alice control logic. Note that the photons could have been sent by a standard Alice or a distributed Alice. As with the distributed Alice embodiment the key for encrypting the link between the Bo and the Ob unit can be derived by QKD by locating an Alice unit in either the Bo or the Ob unit and a Bob in the other. The idea of a distributed Bob also scales to multiple hops.

Whether one adopts a distributed Alice or distributed Bob approach in the method of the present invention the QKD algorithm is applied between the first node in the chain, which contains the controlling logic, and each of the other nodes in turn. Thus the outcome of the QKD algorithm is authenticated between the first node and subsequent nodes, so the first node needs to know the identity keys of each subsequent node, while adjacent nodes do not need to know each others identity.

Consequently, should a node fail and need to be replaced, a new identity key must be loaded into the new node and the central node. It is particularly important to note that the new identity need not be delivered to nodes in the chain that are adjacent to the new node.

This means that the field engineer responsible for replacing equipment can load a crypto fill gun with new identity keys that are know to the first node in the chain and then use this gun to load keys into new nodes as they are deployed, without needing to visit any other location.

Figure 5:
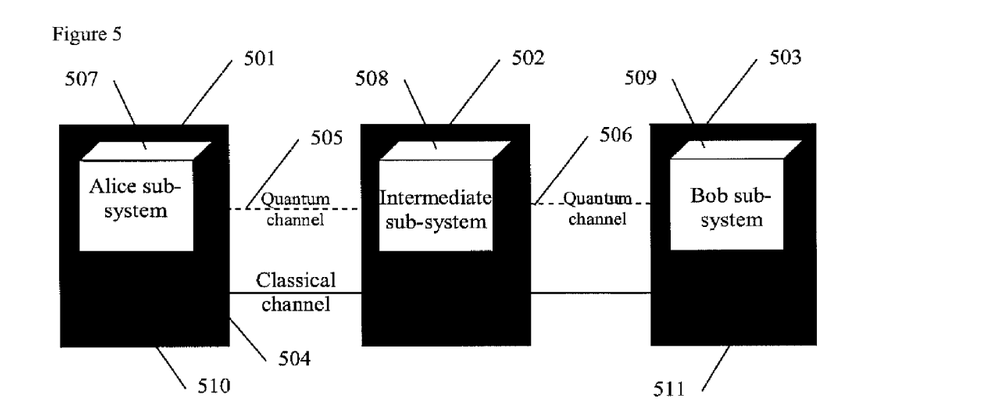
FIG. 5 shows a three node embodiment of the present invention.

FIG. 5 shows the simplest arrangement of a chain with three nodes. The first node 501 is the controlling node. The second node 502 is an intermediate node, of which in general there may be many joined together in the chain. The last node 503 is the destination, with which the first node needs to establish a shared secret key.

All nodes are connected together using a classical channel 504. This may be any form of electronic or optical communication technology that allows the first node to communicate with each of the other nodes.

The first node 501 is also connected to the second node 502 with a quantum channel 505 and the second node 502 is connected to the third node 503 with a second quantum channel 506.

Each of the two quantum channels 505 and 506 are optical communication paths, either in free space or along optical fibres. These carry single photons in one direction, from the first node to the second and from the second to the third.

The first node contains an Alice sub-system 507 that connects to the classical channel 504 and the quantum channel 505, to which it sends photons. The Alice sub-system is described in more detail below with reference to FIG. 6.

The second node contains an intermediate sub-system 508 that connects to the classical channel 504. It also connects to both quantum channels—it receives from quantum channel 505 and sends to quantum channel 506. The intermediate sub-system is described in more detail below with reference to FIG. 7.

The third node contains a Bob sub-system 509 that connects to the classical channel 504 and the quantum channel 506, from which it receives photons. The Bob sub-system may be the same as Bob 104 described with reference to FIG. 1.

As a result of the operation of the system, the Alice sub-system and the Bob sub-system each produce a cryptographic key, 510 and 511 respectively. These two keys will be identical values that are known to no other party, even one that has been observing the communication on the quantum and classical channels.

Figure 6:
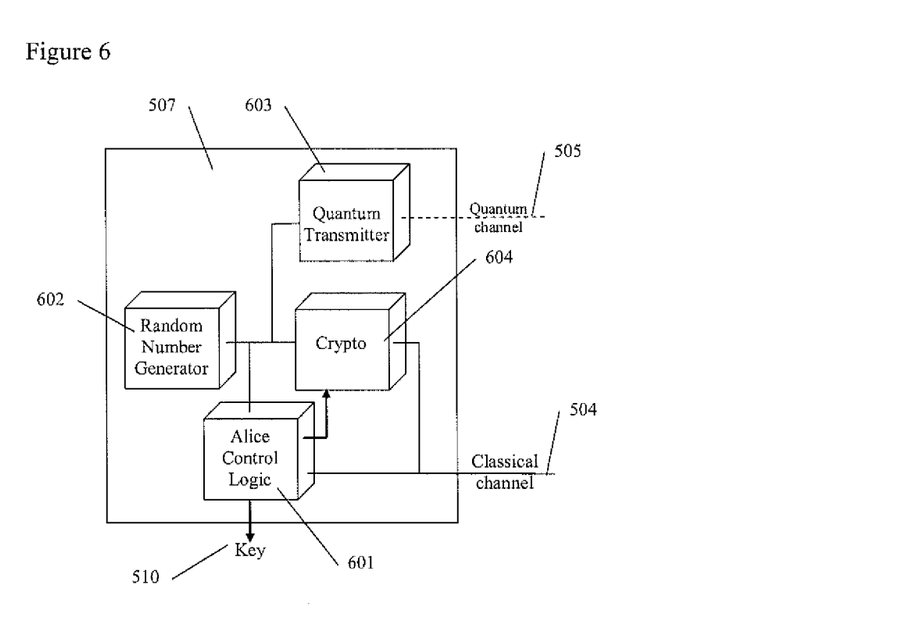
FIG. 6 shows the Alice sub-system of FIG. 5 in more detail.

The Alice sub-system comprises the parts shown in more detail in FIG. 6. The Alice control logic 601 coordinates and controls all the other parts of the sub-system. It can command a random number generator 602 to produce pairs of random binary digits. It stores these internally and can either copy them to a quantum transmitter 603 or a crypto 604.

The quantum transmitter 603 converts the two random binary digits into a single photon that is sent to the quantum channel 505. The random bits determine which of the four possible quantum states are to be used for the photon.

The crypto 604 receives the random bits from the random number generator and encrypts them, sending the encrypted result to the intermediate sub-system via the classical channel 504.

The Alice control logic works in two phases. In the first phase it establishes a key with the intermediate sub-system, using the quantum transmitter 603 to send the quantum signal and the classical channel 504 to agree a key which is used to control subsequent encryption performed by the crypto 604. In the second phase Alice establishes a key with the Bob sub-system, using the crypto 604 to send the random bits to the intermediate system which then uses them to generate a quantum signal sent to Bob.

Figure 7:
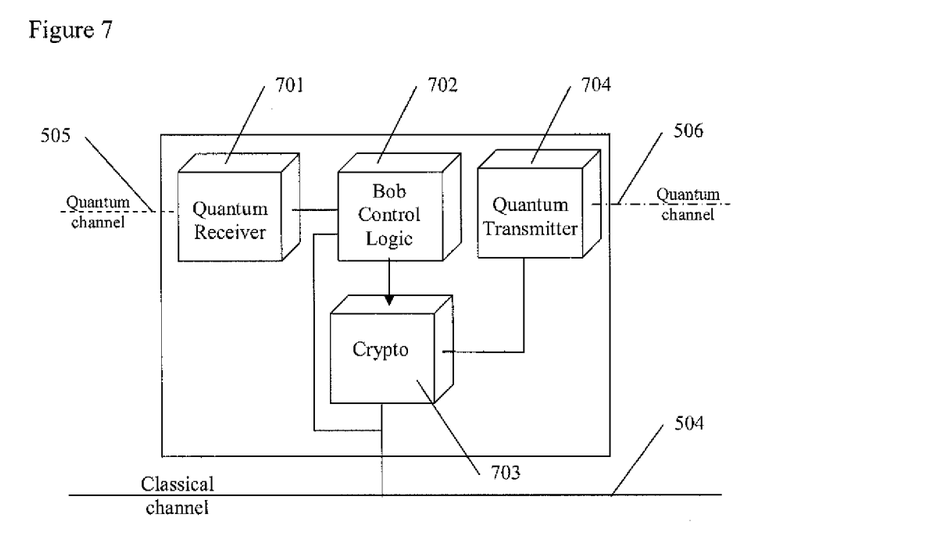
FIG. 7 shows the intermediate sub-system of FIG. 5 in more detail.

The structure of the intermediate sub-system is shown in FIG. 7. The quantum receiver 701 receives a quantum signal from Alice via the quantum channel 505 and passes this to the Bob control logic 702. Once this signal is received, the Bob logic discusses the outcome by exchanging messages with the Alice logic via the classical channel 504. The output of this process is a key which is used to control the encryption performed by the crypto 703.

Messages carrying encrypted random numbers sent from Alice's crypto 604 are fed into the crypto 703. Since both these cryptos have the same key, the original random numbers emerge from the crypto and pass to the quantum transmitter 704. This uses them to encode single photons on the quantum channel 506 which is connected to the Bob sub-system.

The quantum receiver 116 of the Bob sub-system 104 receives a quantum signal from Alice and passes this to the Bob control logic 118. This signal is passed across the encrypted channel setup between Alice and the intermediate system and then across the quantum channel from the intermediate system to the quantum receiver. Once this signal is received, the Bob logic discusses the outcome by exchanging messages with the Alice logic via the classical channel 504. The output of this process is the key 511.

Referring now back to FIG. 7, as described above the quantum signal received by the quantum receiver 701 is used by Bob control logic 702 to agree a quantum key with the Alice sub-system. This quantum key is then used by crypto-unit 703 to decrypt a message from the Alice sub-system containing a series of random numbers to be used by quantum transmitter 704 in modulating the quantum signal transmitted to the Bob sub-system.

Figure 8:
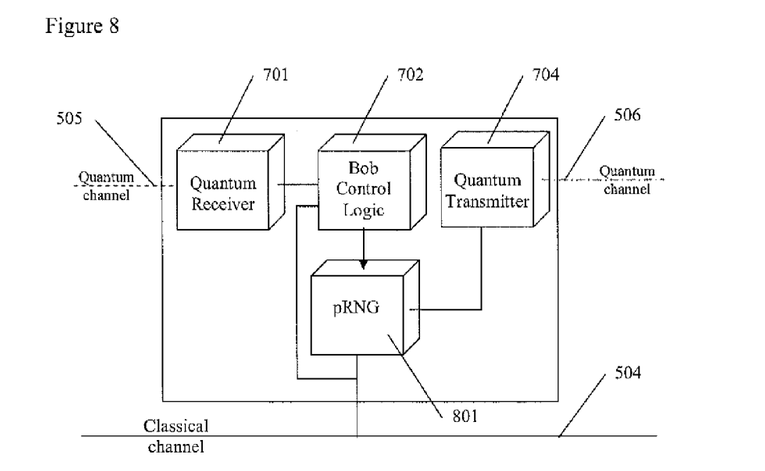
FIG. 8 shows an arrangement which uses the quantum key derived as the basis for determining the modulation to be applied to the quantum signal.

However it will be apparent that the quantum key agreed between the Alice sub-system and the intermediate sub-system is essentially a random number sequence known to both the Alice sub-system and the intermediate sub-system. Further it will be clear that the quantum key is secret. In another embodiment therefore, shown in FIG. 8, the intermediate sub-system uses the quantum key itself to determine the modulation to be applied to the quantum transmission. The intermediate sub-system comprises a quantum receiver 701 and Bob control logic 702 which operate as described above to detect a quantum signal transmitted by the Alice sub-system and agree a quantum key. This quantum key is then used as a seed in a pseudo random number generator 801 to generate a longer random sequence. The output of the pseudo random number generator is then used to modulate the quantum signal transmitted by the transmitter 704. Thus rather than receive a string of random numbers from the Alice sub-system the intermediate sub-system uses the quantum key to derive a string of random numbers. The Alice sub-system enters the same quantum key into an identical pseudo random number generator and hence produces the same string. Thus no communication between the Alice and intermediate systems other than that needed to agree a quantum key. The quantum key agreement communications can be conducted in the open and hence the intermediate sub-system does not require a crypto unit and no encrypted traffic is passed between the Alice sub-system and the intermediate sub-system.

The invention claimed is:

1. A method of quantum key distribution, comprising a quantum exchange step and a key agreement step that is subsequent to the quantum exchange step, wherein, in the quantum exchange step, a first quantum node and a second quantum node exchange a quantum signal over a quantum link between the first quantum node and the second quantum node and wherein the first quantum node communicates with a first remote node such that the first remote node has all of the information regarding at least one of the quantum signal transmitted or the quantum signal detected by the first quantum node necessary to agree a quantum key with the second quantum node, and the first remote node replaces the first quantum node in the subsequent key agreement step.

2. The method as claimed in claim 1 wherein the first remote node communicates with the first quantum node such that the first remote node knows an encoding base applied and data value for at least one of each photon transmitted or each photon detected by the first quantum node.

3. The method as claimed in claim 1 wherein the first remote node performs the key agreement step with the second quantum node.

4. The method as claimed in claim 1 wherein there is no direct quantum link between the first remote node and the second quantum node.

5. The method as claimed in claim 1 wherein the first remote node and second quantum node mutually authenticate the quantum exchange.

6. The method as claimed in claim 1 wherein the second quantum node communicates at least one of information regarding the quantum signal transmitted or the quantum signal received by the second quantum node with a second remote node and wherein the key agreement step is performed between the first remote node and the second remote node.

7. The method as claimed claim 1 comprising a step of using a quantum key agreed in the key agreement step between the first remote node and the second quantum node to encrypt communications between the first remote node and the second quantum node in an end-to-end encryption arrangement.

8. The method as claimed in claim 1 wherein the method is iteratively repeated for further quantum links.

9. The method as claimed in claim 1 wherein there is no authentication between the first and second quantum nodes.

10. The method as claimed in claim 1 wherein the first quantum node comprises a quantum transmitter for transmitting a quantum signal to the second quantum node and the second quantum node comprises a quantum receiver for receiving the quantum signal from the first quantum node and the communication between the first remote node and the first quantum node comprises the first quantum node sending information about one of the following: a modulation applied to the quantum signal to the first remote node, the modulation to be applied to the quantum signal.

11. The method as claimed in claim 10 in which the method comprises sending information about the modulation to be applied to the quantum signal, the method further comprising the steps of transmitting a string of random numbers from the first remote node to the first quantum node and using the string of random numbers at the first quantum node to determine the quantum signal transmitted.

12. The method as claimed in claim 10 in which the method comprises sending information about the modulation to be applied to the quantum signal, the method further comprising the steps of transmitting a random number string from the first remote node to the first quantum node and using the transmitted random number string as a seed in a pseudo-random number generator.

13. The method as claimed in claim 1 wherein the first quantum node comprises a quantum transmitter for transmitting a quantum signal to the second quantum node and the second quantum node comprises a quantum receiver for receiving the quantum signal from the first quantum node, the method comprising the step of using a first quantum key agreed between the first remote node and first quantum node to determine a modulation applied to the quantum signal transmitted between the first quantum node and second quantum node.

14. The method as claimed in claim 13 comprising the step of using the first quantum key as a seed in a pseudo random number generator.

15. The method as claimed in claim 1 wherein the first quantum node comprises a quantum receiver and the second quantum node comprises a quantum transmitter and the communication between the first remote node and the first quantum node comprises the first quantum node sending information to the first remote node about a modulation measured on the received quantum signal.

16. A serial quantum key distribution apparatus comprising a control QKD device linked in series, via at least one intermediate QKD device, with an endpoint QKD device wherein each of said QKD devices has at least one quantum transmitter or quantum receiver that exchanges a quantum signal with an adjacent QKD device, wherein each intermediate QKD device comprises a crypto-unit for communicating all of the information required to agree a quantum key regarding the quantum signal transmitted to or received from the subsequent QKD device in the series with a crypto-unit at the control QKD device and wherein the control QKD device agrees a quantum key with each of said intermediate QKD devices and the end point QKD device in the series in sequence.

17. The serial quantum key distribution apparatus as claimed in claim 16 wherein each intermediate QKD device has at least one quantum transmitter and at least one quantum receiver, the quantum transmitter transmits a quantum signal to one of the adjacent QKD devices in the series and to receive a quantum signal transmitted by another adjacent QKD device, and each intermediate QKD device receives a quantum signal from a previous QKD device in the series and to transmit a quantum signal to the subsequent QKD device in the series.

18. The serial quantum key distribution apparatus as claimed in claim 17 wherein each intermediate QKD device uses information transmitted from the control QKD device, via the crypto-units, to modulate the transmitted quantum signal.

19. The serial quantum key distribution apparatus as claimed in claim 18 wherein both the control QKD device and at least one intermediate device comprise identical pseudo-random number generators.

20. The serial quantum key distribution apparatus as claimed in claim 19 wherein the control QKD device generates and sends, via the crypto-unit, a seed random number to an intermediate QKD device and the intermediate QKD device passes the seed random number to the pseudo-random generator.

21. An intermediate QKD device comprising
a quantum signal transmitter that modulates a quantum signal based on encrypted data received from a remote device; and
a pseudo-random number generator,
wherein the pseudo-random number generator expands the data received from the remote device and wherein the quantum signal transmitter uses the expanded data in modulation of a quantum signal.

* * * * *